Oct. 9, 1951   F. P. NOONE ET AL   2,570,587
              AUTOMOTIVE EQUIPMENT
              Filed April 29, 1947
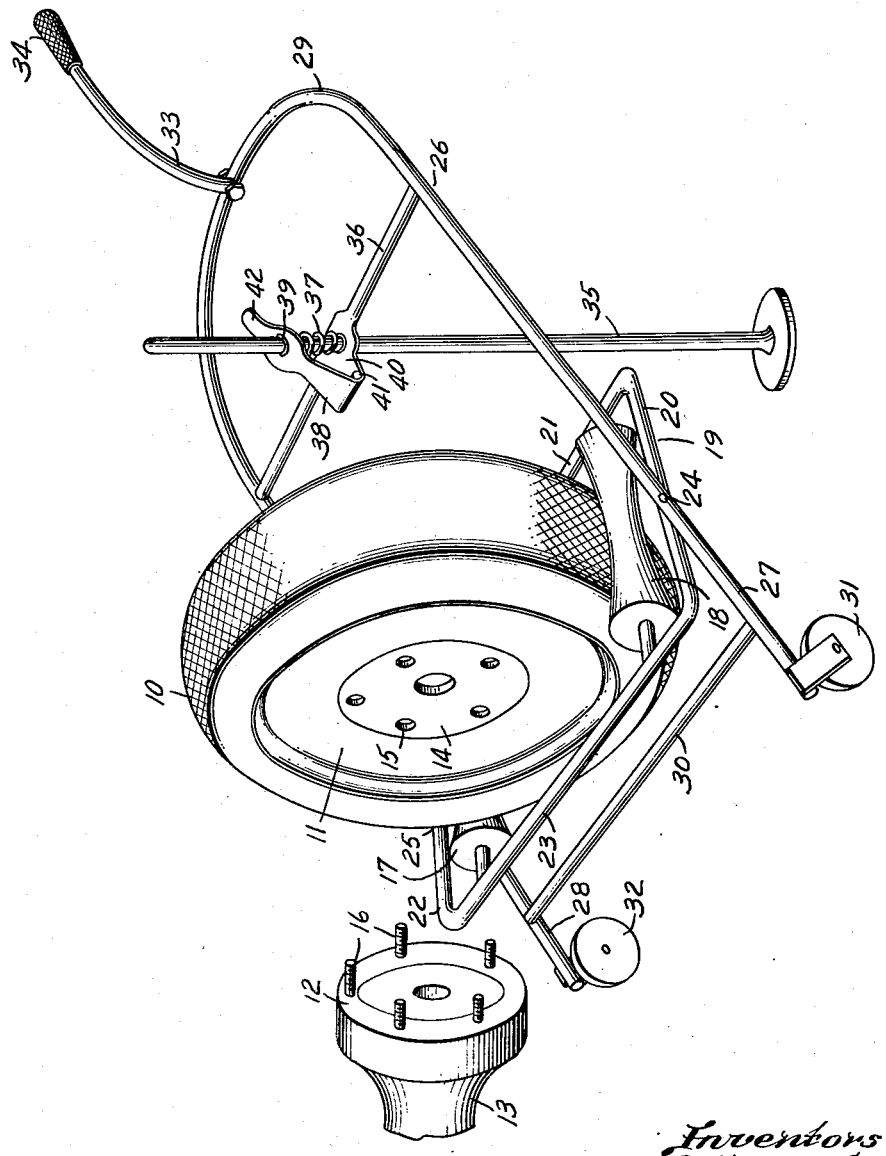
Inventors
FRANK P. NOONE &
ARTHUR C. MULLIN
BY  Attorneys Patented Oct. 9, 1951

2,570,587

UNITED STATES PATENT OFFICE 2,570,587

AUTOMOTIVE EQUIPMENT

Frank P. Noone and Arthur C. Mullin, Philadelphia, Pa.; said Mullin assignor to said Noone Application April 29, 1947, Serial No. 744,668

5 Claims. (Cl. 214—1)

This invention relates to a device for maneuvering vehicle tires and wheels.

The modern automobile tire is normally mounted on a rim that is integral with the wheel. When the inner tube has been inflated, the tire is locked into the rim, usually by the pressure of the inner tube which presses circumferential beads on each inner lip of the tire into engagement with the rim. The tire, tube, rim and wheel are carried as a unit replacement which is substituted for another similar unit on the vehicle in case of a flat tire or other mishap.

To hold the wheel in place on the vehicle spaced holes in the wheel web are placed over studs on the hub, and nuts are drawn up on the studs to clamp the wheel firmly in place. Aligning the holes in the wheel web with the studs is an annoying and fatiguing job as normally practiced since the weight of the tire and wheel must be supported with the hands while the wheel is maneuvered to match the holes and the studs. Naturally, the difficulty of maneuvering the wheel into place increases with an increase in the size and weight of the tire and wheel combination. Deep drawn fenders of a streamlined design which cover portions of the tops of the wheels on the outside add greatly to the troubles which are encountered in locating the wheel on the hub. If the sides of the holes in the wheel web are allowed to strike the studs as the wheel is moved into position, the threads on the studs may be distorted. This damage makes it difficult to screw on the nuts which hold the wheel web firmly against the hub.

In other types of wheel construction the tire and the inner tube are mounted on a rim which must be fitted on the wheel which normally remains on the vehicle. In this case it is usually necessary to align the valve stem of the inner tube with a hole in the wheel and to match lug positions on the wheel and the rim.

The device of the present invention, usually built in the form of a handtruck or dolly, facilitates maneuvering the tire and wheel combination, or the tire and rim combination, into the proper alignment for mounting on the hub or wheel. When it is employed, the wheel web holes may be carefully aligned with the studs on the hub, and the wheel run smoothly into place without damage to the threads on the studs. Not only can the wheel be rotated in a vertical plane, but also the plane of the wheel may be made parallel to the plane of the face of the hub. In accomplishing these maneuvers with the invention the operator is relieved of most of the burden of lifting and holding the tire and the wheel.

The invention is not limited to any particular construction of the tire or of the wheel. Solid rubber tires as well as pneumatic tires may be handled with the device.

An object of the invention is to provide a device which will facilitate maneuvering a vehicle tire and wheel into the proper position for mounting on the hub during tire changing operations.

Another object is to furnish a light, maneuverable device which will relieve the operator of much of the burden of lifting and holding the tire and wheel while maneuvering them into position for mounting.

A further object is to provide a light portable device which is easily carried so that it will be readily available when tire changing becomes necessary.

Other objects of the invention will be apparent from the following description and the attached drawing in which The single figure shows a perspective view of an embodiment of the invention as it is used with a tire, wheel and hub.

As shown in the figure a tire 10 and a wheel 11 such as those used on automobiles is held adjacent to a hub 12 such as that on a vehicle axle 13. A web 14 of the wheel 11 is drilled with spaced holes 15 designed to fit over studs 16 which are fastened to the hub 12. Tire supporting members 17 and 18 may be rotatably mounted in a cage member or crosspiece 19. This crosspiece may be made of any structural design such as tubular members 20, 21, 22, and 23 joined to form a rectangular structure. The tubular members 20 and 22 are provided with projecting journals 24 and 25 which are rotatably mounted in a rigid frame structure 26 comprising side members 27 and 28 and connectors 29 and 30. Conveniently, supports in the form of wheels 31 and 32 are employed rotatably mounted at the ends of the parallel side members 27 and 28 although other well known means of support may be employed. If desired, maneuvering handle 33 may be detachably connected to the frame connector 29 providing a hand lifting and maneuvering grip 34 at a greater distance from the pivot point formed by the wheels 31 and 32 than the mounting points for the journals 24 and 25 of the crosspiece 19. The maneuvering handle 33 may be omitted if the connector 29 is located at a suitable distance from the wheels 31 and 32, and the connector 29 used as a handgrip. It will be noted particularly that in any case the portion which is to be gripped with the hand is at a greater distance from the center about which the device is to be rotated than the distance of the point of application of the weight of the tire and wheel from that center. Especially attention should be given to the fact that the subhandgrip, such as grip 34, is on the same side of the effective fulcrum of the device, such as the axis of the wheels 31 and 32, as the point of application of the load comprising the weight of the tire, the tube and the wheel.

It is frequently desirable to use a support 35 to keep the device tilted at the proper angle while the wheel is being maneuvered into place on the vehicle. As illustrated, this support 35 may pass through a cross member 36 which is rotatably mounted on the parallel side members 27 and 28. A pressure member or spring 37 rests on the cross member 36 and urges a latch piece or friction member 38 into holding position against the support. It will be understood that a hole 39 in the friction member 38 is slightly larger in diameter than the support 35. This friction member 38 is pivotally connected to an extension 40 of the cross member 36 about a pin 41. When it is desired to change the angular position of the whole device, an extension 42 of the member 38 is pushed downward against pressure of the spring 37 to release the member 38 from its holding position.

In operating the device the support 35 is first rotated with the cross member 36 so that it is momentarily inoperative. The parallel side members 27 and 28 are placed flat on the ground, and an inflated tire mounted on a suitable wheel is rolled into position on the tire supporting members 17 and 18. It will be understood that the crosspiece 19 has been rotated about the journals 24 and 25 so that it lies in approximately the same plane as the side members 27 and 28. The operator then steadies the tire with one hand while he lifts the device by grasping the handgrip 34 and lifting it through an arc about the axis of wheels 31 and 32. As the operator lifts the device, the crosspiece 19 rotates about the journals 24 and 25 so that the tire is supported in a plane vertical to the ground. The tire may then be moved into position adjacent to the hub and raised or lowered into alignment. Although the operator may hold it in this position with one hand on the handgrip 34 while he rotates the tire into the correct position with the other hand, it may be convenient to set the support 35 at the proper level and to use both hands to rotate the tire until the wheel will go onto the hub satisfactorily.

Alternative forms of the invention will be apparent to those skilled in the art, and we therefore wish to be limited only by the scope of the following claims.

We claim:

1. A handtruck for maneuvering vehicle tires comprising, a pair of substantially parallel rigid frame members, a rigid connection forming said frame members into a frame structure, a pair of wheels rotatably mounted on said frame structure, a substantially rectangular crosspiece rotatably mounted in said frame structure at a distance from said wheels, a pair of tire support members rotatably mounted in said crosspiece, and a maneuvering handle on said frame structure at a greater distance from said wheels than said crosspiece.

2. A handtruck for maneuvering vehicle tires comprising, a pair of substantially parallel rigid frame members, a rigid connection forming said frame members into a frame structure, a pair of wheels journaled to said frame structure, a substantially rectangular crosspiece rotatably mounted in said frame structure at a distance from said wheels, a pair of tire support members rotatably mounted in said crosspiece, a maneuvering handle on said frame structure at a greater distance from said wheels than said crosspiece, and an adjustable support member for said frame structure.

3. A dolly for handling vehicle tires comprising, a frame having two substantially parallel members, a crosspiece rotatably mounted between said members, tire supporting rollers rotatably mounted on said crosspiece substantially parallel to said members, wheels rotatably mounted on said frame and forming a support and pivot therefor, a handle connected to said frame, and a stand adjustably attached to said frame and forming a rest for said frame in elevated positions.

4. A hand truck for maneuvering vehicle tires, comprising a frame structure including supports, rollers mounted at one end of the supports, a maneuvering handle mounted at the opposite end of the supports, there being an open interior space in the frame between the rollers and the maneuvering handle, a generally rectangular cage pivotally mounted at approximately the middle of the cage on an axis extending transversely of the frame and transversely to the handle, the cage being freely swingable about its pivot, and wheel supporting members extending across the cage in spaced relation in a direction transverse to the pivotal axis of the cage.

5. A hand truck for maneuvering vehicle tires comprising a frame, rollers at one end of the frame, a maneuvering handle at the opposite end of the frame, the frame having an open interior space between the rollers and the handle, a cage of generally rectangular form pivoted at approximately the middle of the cage on the frame on an axis transverse to the handle, the cage being freely swingable about its pivot, and a pair of parallel rotatable wheel supporting rollers rotatably mounted on the cage on axes transverse to the pivot axis of the cage itself.

FRANK P. NOONE.
ARTHUR C. MULLIN.

REFERENCES CITED

The following references are of record in the file of this patent:

UNITED STATES PATENTS

| Number | Name | Date |
|---|---|---|
| 1,310,499 | Leman | July 22, 1919 |
| 1,847,382 | Collins | Mar. 1, 1932 |
| 2,345,458 | Caron | Mar. 28, 1944 |
| 2,379,587 | Moore | July 3, 1945 |
| 2,380,415 | Carruthers | July 31, 1945 |

FOREIGN PATENTS

| Number | Country | Date |
|---|---|---|
| 474,605 | Great Britain | Apr. 28, 1936 |
| 572,043 | Germany | Mar. 9, 1933 |
| 642,021 | Germany | Feb. 20, 1937 |